United States Patent [19]

Wakino

[11] 4,424,615
[45] Jan. 10, 1984

[54] CAPACITOR AND METHOD OF MANUFACTURING THE SAME

[75] Inventor: Kikuo Wakino, Muko, Japan

[73] Assignee: Murata Manufacturing Co., Ltd., Japan

[21] Appl. No.: 249,428

[22] Filed: Mar. 31, 1981

[30] Foreign Application Priority Data

Apr. 3, 1980 [JP] Japan .................................. 55-44141

[51] Int. Cl.$^3$ ........................ H01G 7/00; H01G 4/06; H01G 4/10
[52] U.S. Cl. .................................. 29/25.42; 361/313; 361/321
[58] Field of Search ................. 427/79; 361/321, 304, 361/313, 323; 29/25.42

[56] References Cited

U.S. PATENT DOCUMENTS

| | | | |
|---|---|---|---|
| 2,389,419 | 11/1945 | Deyrup | 361/321 X |
| 2,779,975 | 2/1957 | Lee et al. | 427/79 X |
| 2,958,117 | 11/1060 | Robinson et al. | 361/304 |
| 3,220,880 | 11/1965 | Feversanger | 427/79 |
| 3,261,077 | 7/1966 | Meisinger | 29/25.42 |
| 3,280,448 | 10/1966 | Brayer | 361/313 X |
| 3,380,854 | 4/1968 | Robinson | 361/321 X |
| 3,518,756 | 7/1970 | Bennett et al. | 29/25.42 X |
| 3,564,359 | 2/1971 | Codaetal | 361/321 X |

FOREIGN PATENT DOCUMENTS 979363  1/1965  United Kingdom ................ 361/313

*Primary Examiner*—Donald A. Griffin
*Attorney, Agent, or Firm*—Ostrolenk, Faber, Gerb & Soffen

[57] ABSTRACT

An improved capacitor and a method of manufacturing the same, aimed at implementation in small size and/or with large capacitance, are disclosed. A pair of composite structures are formed. Each composite structure includes insulating layers of ceramic material formed on a base plate of a flexible material. At least one electrode is formed on the insulating layer. A dielectric layer of a ceramic green sheet of extremely small thickness, as thin as approximately 3 microns, is formed on the insulating layer covering the electrode. The two composite structures are joined to form a laminate such that respective base plates are located on the outside of the resultant laminate and the respective electrodes face each other through respective extremely thin dielectric layers. The resultant laminate is fired in a heating furnace after the respective base plates are removed. As a result, a capacitor is formed whose electrostatic capacitance is defined between the two electrodes.

9 Claims, 11 Drawing Figures

CAPACITOR AND METHOD OF MANUFACTURING THE SAME

BACKGROUND OF THE INVENTION

1. Field of the Invention

The present invention relates to a capacitor and a method of manufacturing the same. More specifically, the present invention is directed to an improvement in a capacitor and a method of manufacturing the same, aimed at implementation in small size and/or with large capacitance.

2. Description of the Prior Art

A capacitor of interest to the present invention is one which employs ceramic as a dielectric material. In manufacturing such a capacitor, a ceramic dielectric material is prepared and formed with electrodes on both surfaces thereof so as to be opposed to each other or a plurality of ceramic green sheets having an electrode partially formed are laminated, whereupon they are fired to complete a capacitor.

One requirement in such capacitors is to implement them with a large capacitance. One means to attain large capacitance in such capacitor is to increase the area of the opposing electrodes; however, such means cannot be employed in applications where a capacitor need be small in size. Therefore, one might think of decreasing the distance between the opposing electrodes as a means for meeting both requirements of small size and large capacitance.

One means for decreasing the distance between the opposing electrodes would be to decrease the thickness of a ceramic serving as a dielectric in the case of a ceramic capacitor. However, in the case of a capacitor of a simple type wherein electrodes are formed on both surfaces of a ceramic dielectric material, there is a limitation to the amount the thickness of the dielectric material can be decreased and hence such an approach is not appropriate to obtain a capacitor of small size and large capacitance. On the other hand, in the case of a laminated capacitor having a plurality of ceramic green sheets, a laminated ceramic sheet is used as a dielectric material, which makes it possible to make the dielectric layer relatively thin. Nevertheless, there is still a limitation to the degree to which the thickness of the dielectric layer can be decreased in the case where a much thinner layer is required.

When using ceramic green sheets the minimum thickness thereof has been limited to several 10 to 100μ from the standpoint of handling thereof. More specifically, a decrease of the thickness of a ceramic green sheet to a value thinner than that decreases the mechanical strength of the sheets, which causes the sheet to be broken or damaged in handling, and hence a limitation to the minimum thickness is naturally determined.

SUMMARY OF THE INVENTION

Accordingly, a principal object of the present invention is to provide a structure of a capacitor and a method of manufacturing the same, suited for making a dielectric extremely thin.

Another object of the present invention is to provide a method of manufacturing a capacitor which enables manufacture of a number of capacitors with efficiency.

The present invention is concerned with a laminated structure in a manufacturing process of a capacitor, and in particular with a laminated structure in which a dielectric layer is formed on an insulating layer which is prepared as temporarily retained on a base plate and made of a material different from the base plate.

In summary, the present invention comprises the steps of preparing a base plate; forming an insulating layer on the base plate, the insulating layer being made of a material different from that of the base plate; forming at least one electrode on a portion of the insulating layer; forming a dielectric layer on the insulating layer covering the electrode; and removing the base plate.

In a preferred embodiment of the present invention, at least one electrode comprises two electrode portions formed on the insulating layer with the two electrode portions being separated from each other.

In a further preferred embodiment of the present invention, a capacitor comprises a first insulating layer prepared as temporarily retained on a first base plate and being made of a material different from that of the first base plate; a first electrode formed on a part of the first insulating layer; and a first dielectric layer formed on the first insulating layer covering the first electrode. The capacitor further comprises another electrode, another insulating layer, and another base plate being disposed on the outer surface of the dielectric layer in symmetry with respect to the first electrode, the first insulating layer and the first base plate, respectively; each of the base plates is removed from the respective one of the insulating layers.

In still a further preferred embodiment of the present invention, a method of a manufacturing a capacitor comprises the steps of preparing a length base plate; forming an insulating layer on the base plate, the insulating layer being made of a material different from that of the base plate; forming a plurality of electrode corresponding conductive films in arrangement on the insulating layer so as to be separated from each other; forming a dielectric layer on the insulating layer covering the electrode corresponding conductive films; cutting a laminated composite including at least the insulating layer, the electrode corresponding conductive films and the dielectric layer such that each laminated composite as cut comprises at least two electrodes separated from each other; and removing the base plate.

In still a further preferred embodiment of the present invention, a first length composite is provided by at least steps of (A) preparing a length base plate; (B) forming an insulating layer on the base plate; (C) forming a plurality of electrode corresponding conductive films in arrangement on the insulating layer so as to be separated from each other; and (D) forming a dielectric layer on the insulating layer covering the electrode corresponding conductive films. Furthermore, a second length composite is provided by at least said steps (A) to (D). The first length composite and the second length composite are joined such that each of the base plates may be disposed outside and each of the electrode corresponding conductive films may be faced to each other through the dielectric layer. The method further comprises the steps of cutting the laminated composites as joined including at least the insulating layer, the electrode corresponding conductive films and the dielectric layer of the first and second length composites, so that each of said layered composites as cut includes at least two electrodes faced to each other through the dielectric layer; and removing the base plate.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 1 and 2 are sectional views for depicting one embodiment of the present invention, wherein FIG. 1 shows a state of the embodiment in the course of manufacture and FIG. 2 shows a capacitor obtained after the FIG. 1 step;

FIGS. 3 and 4 are sectional views for depicting another embodiment of the present invention, wherein FIG. 3 shows a state in the course of manufacture and FIG. 4 shows a capacitor obtained after the FIG. 3 step;

FIGS. 5 and 6 are sectional views for depicting a further embodiment of the present invention, wherein FIG. 5 shows a state in the course of manufacture and FIG. 6 shows a capacitor obtained at the FIG. 5 step;

DESCRIPTION OF THE PREFERRED EMBODIMENTS

Figure 1:
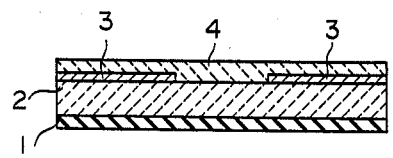
Figure 2:
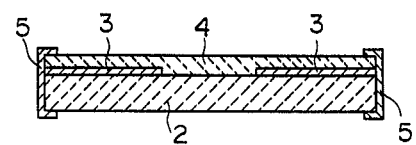

FIGS. 1 and 2 are sectional views depicting one embodiment of the present invention, wherein FIG. 1 shows a state of the embodiment in the course of manufacture and FIG. 2 is a capacitor obtained after the step of FIG. 1.

Referring to FIG. 1, a base plate 1 is prepared. The base plate 1 is preferrably of a flexible material such as polyethylene, polypropylene, Mylar, vinyl chloride resin, aluminum or the like. An insulating layer 2 is formed on the base plate 1 and ceramic is preferably selected as a material for the insulating layer 2. In the case of ceramic, the insluating layer 2 is formed by placing a ceramic green sheet before firing thereof on the base plate 1 having a thickness of approximately 20 to 200$\mu$. At least two electrodes 3, separated from each other, are formed on a part of the insulating layer 2. Preferably the electrodes are made of a material which is not molten at a temperature higher than say 1000° C. (for example, silver-palladium, palladium, platinum, platinum-palladium or the like) and these electrodes are formed by painting a dispersion thereof. A dielectric layer 4 is formed on the insulating layer 2 covering these electrodes 3. The dielectric layer 4 is preferably made of ceramic. Since the dielectric layer 4 of ceramic can be formed on the base plate 1 and the insulating layer 2 having a sufficient thickness to provide a necessary mechanical strength with the layer 4 maintained thereon, the dielectric layer 4 can well maintain its shape even with an extremely small thickness as thin as approximately 3$\mu$. The dielectric layer 4 can be formed by spraying a slurry of raw ceramic before firing, by painting, by sputtering, by evaporating or the like. Furthermore, even if the dielectric material is in a ceramic green sheet state, it can be immediately disposed on the base plate 1 and the insulating layer 2 and is seldom handled by itself. Therefore, if it is possible to fabricate an extremely thin ceramic green sheet, an approach may be employed in which such a ceramic sheet is placed on the insulating layer 2. In order to achieve such approach, for example a thin ceramic green sheet may be suspended and a composite including the base plate and the insulating layer 2 may be moved transversely thereof, while the dielectric layer 4 is formed thereon. According to such approach, the dielectric layer 4 can be formed without any direct contact by hand with the dielectric layer 4. Thus, an extremely thin dielectric layer 4 can be formed using a prefabricated ceramic green sheet, apart from the above described spraying method or the like. Meanwhile, the dielectric layer 4 can be formed to as small a thickness as approximately 3$\mu$, as described above; however, generally the layer 4 is formed to a thickness of 3 to 50$\mu$. As shown in FIG. 2, the base plate 1 is then removed. The removing step is achieved by a step of peeling the base plate 1 from the insulating layer 2. To aid in the peeling off step, the base plate 1 is preferably flexible.

The composite thus obtained after the base plate 1 is removed is placed in a heating furnace, where firing of the ceramic constituting the dielectric layer 4 and the insulating layer 2 and baking of the electrodes are effected. By forming a pair of external electrodes 5 on the outer surface of the thus fired composite, a capacitor is completed, in which an electrostatic capacitance is formed between the opposing electrodes 3. It is pointed out that the capacitor depicted in conjunction with FIGS. 1 and 2 is of a type structured to attain an extremely small capacitance.

Figure 3:
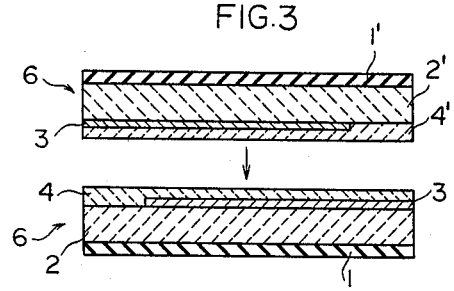
Figure 4:
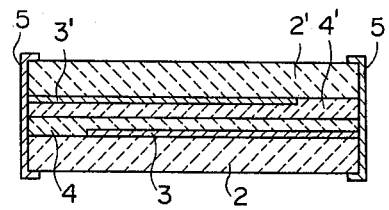

FIGS. 3 and 4 are sectional views for describing another embodiment of the present invention, wherein FIG. 3 shows a state of the embodiment in the course of manufacture and FIG. 4 shows a capacitor obtained after the step of FIG. 3.

Referring to FIG. 3, two composites of substantially the same structure as shown in FIG. 1 are prepared. The FIG. 3 composite is merely different from the structure shown in FIG. 1 in that two electrodes 3 are not formed for one composite but at least one electrode 3 is formed. These composites 6 and 6' are joined such that the respective base plates 1 and 1' are located outside of the combined structure and the respective electrodes 3 and 3' face each other through respective dielectric layers 4 and 4'.

As shown in FIG. 4, the respective base plates 1 and 1' are removed. In such a state, the composite is fired in a heating furnace and a pair of external electrodes 5 are formed on the thus obtained composite. As a result of the firing of the composite, the dielectric layers (formed of a ceramic material) are simultaneously sintered so as to be integrated with each other. As a result, a capacitor is completed in which an electrostatic capacitance is formed between the electrodes 3 and 3'. Since the dielectric layers 4 and 4' can be formed as an extremely thin layer in the capacitor thus obtained, a capacitor of a large capacitance is implemented.

Figure 5:
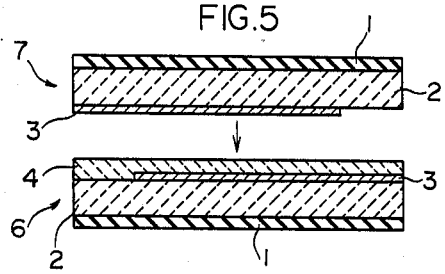
Figure 6:
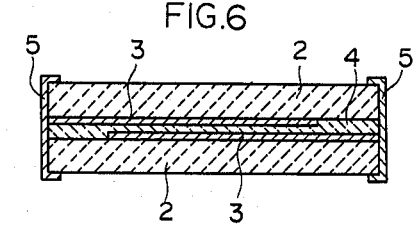

FIGS. 5 and 6 are sectional views depicting a further embodiment of the present invention, in which FIG. 5 shows a state in the course of manufacture and FIG. 6 shows a capacitor obtained after the step of FIG. 5. Referring to FIG. 5, two composites are prepared, wherein one composite 6 is the same as shown in FIG. 3 and the other composite 7 is substantially the same as the FIG. 3 composite 6, except for omission of the dielectric layer 4.

The above described composites 6 and 7 are joined each other. Then the respective base plate 1 disposed outside are peeled off, whereby a composite as shown in FIG. 6 is obtained. The composite in such state is fired and then external electrodes 5 are formed, whereby a capacitor is provided in which an electrostatic capacitance is formed between the electrodes 3 and 3'. Since the capacitor thus obtained has one dielectric layer 4 omitted as compared with the capacitor shown in FIGS. 3 and 4, the capacitor thus obtained has a much smaller distance between the electrodes 3 and 3 and hence can provide an increased capacitance.

Figure 7:
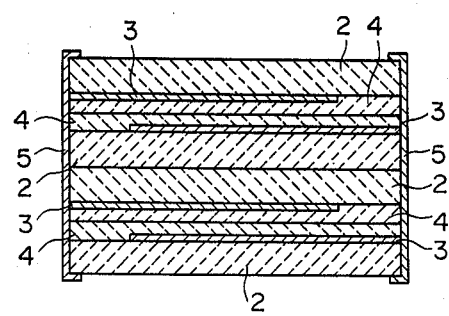
FIG. 7 is a sectional view of a capacitor of still a further embodiment of the present invention.

FIG. 7 is a sectional view of a capacitor in accordance with still a further embodiment of the present invention. The FIG. 7 embodiment may employ the same approaches as employed in the embodiments shown in FIGS. 3, 4, 5 and 6 but further employs junction of the respective composites before firing baking thus obtained. This approach may be further reeated to implement a lamination. By forming the external electrodes 5 and 5 after firing a capacitor is provided which involves substantially two electrostatic capacitance forming portions between four electrodes 3.

Figure 8:
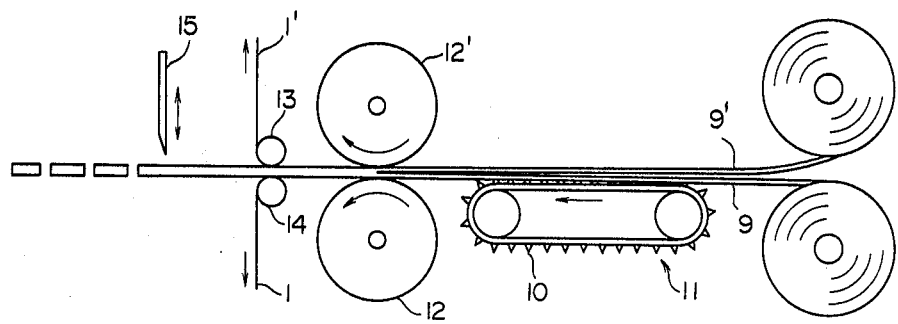
FIG. 8 is a diagrammatic view of an apparatus practicing still a further embodiment of the inventive method.
Figure 9:
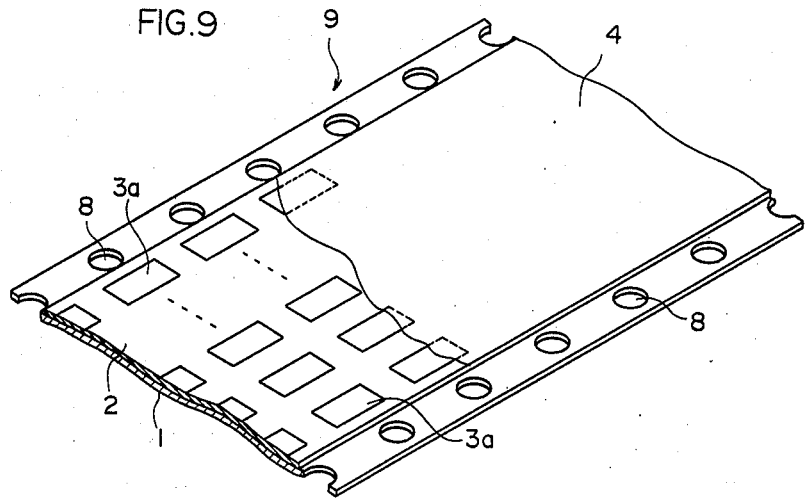
FIG. 9 is a perspective view showing a portion of a length composite being applied to the FIG. 8 apparatus.
Figure 10:
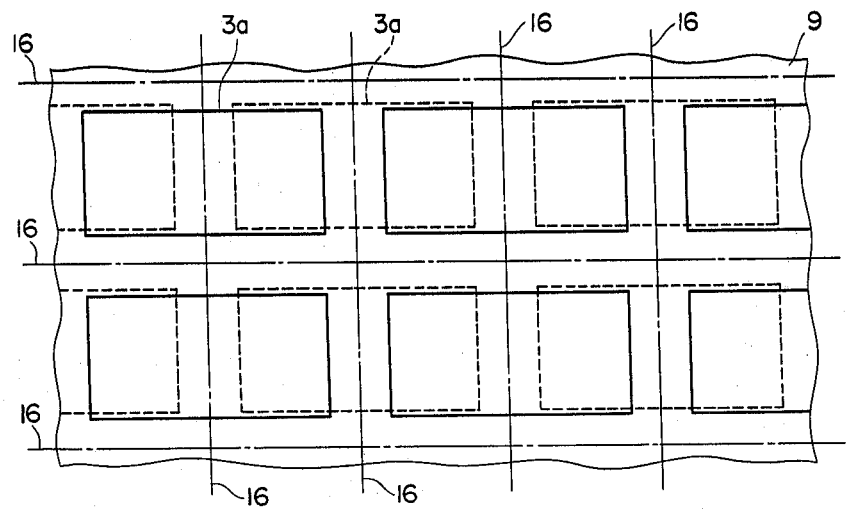
FIG. 10 is a diagrammatic plan view of a length composite for supplementing a description of the FIG. 8 step.

FIG. 8 is a diagrammatic view of an apparatus practicing still a further embodiment of the inventive method and FIG. 9 is a perspective view showing a portion of the length structure which is applied to the FIG. 8 apparatus. FIG. 10 is a diagrammatic plan view of the length structure supplementing a description of the FIG. 8 step.

Now referring to FIGS. 8 to 10, a method for manufacturing a capacitor described in conjunction with FIGS. 3 and 4 will be described. The base plate 1 is formed in a length, as shown in FIG. 9, having perforations 8 formed at equal spaces on both sides (occasionaly at one side) of base plate 1. The insulating layer 2 is formed on the base plate 1, excluding the portion where the perforations 8 are formed. Conductive films 3a are formed, arranged in rows and columns, on the insulating layer 2. These conductive films 3a correspond to the electrodes 3 and become electrodes of capacitors at a subsequent step. A dielectric layer 4 is formed on the insulating layer 2 covering the electrode corresponding conductive films 3a. Thus an elongated composite structure 9 is obtained. Now referring to FIG. 8, two of the composite structures 9 are prepared and are wound in roll and simultaneously and continuously fed. A feeding apparatus 11 having claws or protrusions 10 moving along a feeding path is employed for feeding the same. The feeding apparatus 11 serves to feed the two composite structures 9 and 9', while maintaining mutual registration of both length composites 9 and 9' by fitting the claws 10 into the perforations 8. A manner of such registration will be described with reference to FIG. 10.

FIG. 10 diagrammatically shows a positional relation of the electrode corresponding conductive films 3a of the respective length composites when the two length composites 9 and 9' are laminated. More specifically, the electrode corresponding conductive films 3a formed on one length composite 9 are shown by the solid line, while those of the other are shown by the dotted line. The electrode corresponding conductive films 3a shown by the solid line and the dotted line are arranged so that these may be overlapped in part. Meanwhile, FIG. 10 shows the electrode corresponding conductive films 3a shown by the solid line and the electrode corresponding conductive films 3a shown by the dotted line are illustrated as slightly misaligned merely to facilitate the illustration of the invention. Such mutual overlapping of the electrode corresponding conductive films 3a cannot be viewed in actuality, since these are covered with the dielectric layers 4. Accordingly, the perforations 8 favorably serve to indicate the positions where the electrode corresponding conductive films 3a are formed. However, depending on the case, the above described perforations 8 may be omitted and in such a case the length composites are fed while the same are sandwiched between two feeding rollers so as to be pressed to each other.

Referring again to FIG. 8, the two length composites 9 and 9' simultaneously fed by the feeding apparatus 11 are pressed between a pair of pressing rollers 12 and 12', whereby the same are mutually pressure adhered. Thereafter the base plates 1 and 1 are peeled off through peeling off rollers 13 and 14. The peeling off step is achieved with ease by directing the base plates 1 and 1 to a separate path while guiding the base plates 1 and 1 with the peeling off rollers 13 and 14 with an appropriate drawing tension. After the peeling off step a cutting step is effected. The cutting step is achieved by a cutting blade 15 diagrammatically shown in FIG. 8. The manner of cutting will be described with reference to FIG. 10.

Referring to FIG. 10, a cutting line 16 where cutting is applied by the cutting blade 15 is shown by the dotted line in FIG. 10. Each of the layered composites as cut along the cutting line 16 corresponds to the structure shown in FIG. 4. Meanwhile, the FIG. 9 length composite 9 may also be used as a material of a capacitor shown in FIG. 2.

As regards the cutting step, the cutting step was effected after the peeling off step in the foregoing description, the cutting step may precede the peeling off step. In such a case, the base plate 1 would also be cut simultaneously. Furthermore, the cutting step may be effected as shown in FIG. 11.

Figure 11:
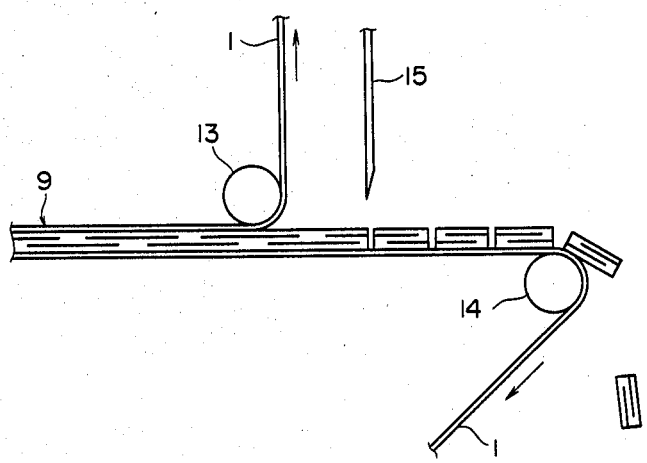
FIG. 11 is a view showing another embodiment of the FIG. 8 cutting step.

FIG. 11 is a view showing another embodiment of the cutting step of FIG. 8. Referring to FIG. 11, the peeling off rollers 13 and 14 for peeling off the respective base plates 1 and 1 from the length composites 9 are disposed so as to be alternately dislocated. Accordingly, after the base plate 1 of one composite is peeled off by the first peeling off roller 13, the base plate 1 of the other composite is peeled off by the second peeling off roller 14, while the length composites 9 are conveyed by the base plate of the other composite. While the length composites 9 are conveyed by the base plate of the other composite, the cutting step is effected by the cutting blade 15. Accordingly, the composites after the cutting step retain the base plate of the other composite and therefore the composites after cutting can be conveyed by simply moving the base plates 1 of the other composite. By selecting the diameter of the second peeling off roller and the drawing direction of the base plates 1 being peeled off by the peeling off roller so that the length composites may be turn acutely peeling off is automatically made and the composites after cutting automatically fall, with the result that the peeling off step can be achieved with efficiency.

Meanwhile, although in the above described embodiments the peeling off step was employed as a step of removing the base plates 1, in the case where the dielectric layers 4 are made of ceramic, for example, an approach may be employed in which the base plate 1 is removed by burning the same simultaneously at the firing step.

As decribed in the foregoing, according to the present invention, a capacitor and a method for manufacturing the same having an extremely thin dielectric layer is provided.

Meanwhile, according to the embodiments disclosed in FIG. 8 et seq, a number of capacitors can be manufactured with high efficiency.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a capacitor, comprising the steps of:
   (A) forming a first composite by:
      (1) preparing a first base plate;
      (2) forming a first ceramic insulating layer on said first base plate, said first insulating layer being made of a material different than that of said first base plate;
      (3) forming a first electrode on a part of said first insulating layer; and
      (4) forming a first ceramic dielectric layer on said first insulating layer and covering said first electrode;
   (B) forming a second composite by:
      (1) preparing a second base plate;
      (2) forming a second ceramic insulating layer on said second base plate, said second insulating layer being made of a material different than that of said second base plate;
      (3) forming a second electrode on a part of said second insulating layer; and
      (4) forming a second ceramic dielectric layer on said second insulating layer and covering said second electrode;
   (C) placing said first and second composites together such that said first and second electrodes face each other with said first and second dielectric layers touching each other and being located between said first and second electrodes;
   (D) firing said first and second composites with said dielectric layers touching each other to simultaneously sinter said first and second ceramic dielectric layers whereby said first and second dielectric layers are integrated with each other; and
   (E) removing said first and second base plates from said first and second insulating layers, respectively.

2. A method of manufacturing a capacitor in accordance with claim 1, wherein said step of removing said base plates comprises the steps of peeling said first and second base plates from said first and second insulating layers, respectively.

3. A method of manufacturing a capacitor in accordance with claim 1 wherein said step of removing said base plates comprises the step of burning said base plates while firing said ceramic dielectric layers.

4. A method of manufacturing a capacitor in accordance with claim 1 wherein said steps of forming dielectric layers comprise the step of spraying a slurry of raw ceramic on said first and second insulating layers.

5. A method of manufacturing a capacitor in accordance with claim 1 wherein said steps of forming dielectric layers comprise the steps of applying respective prefabricated ceramic green sheets on said first and second insulating layers.

6. A method of manufacturing a capacitor in accordance with claim 1, wherein said steps of forming dielectric layers each comprises the step of painting a dispersion of raw ceramic on said first and second insulating layers.

7. A method of manufacturing a capacitor in accordance with claim 1, wherein said steps of forming dielectric layers comprises the step of sputtering a ceramic on said first and second insulating layers.

8. A method of manufacturing a capacitor in accordance with claim 1 wherein said steps of forming dielectric layers comprises the step of evaporating ceramic on said first and second insulating layers.

9. A method of manufacturing a capacitor, comprising the steps of:
   (A) forming a first composite including:
      (1) a first ceramic insulating layer;
      (2) a first electrode located on part of said first insulating layer; and
      (3) a first ceramic dielectric layer located on said first ceramic insulating layer and covering said first electrode;
   (B) forming a second composite including:
      (1) a second ceramic insulating layer;
      (2) a second electrode located on part of said second insulating layer; and
      (3) a second ceramic dielectric layer located on said second ceramic insulating layer and covering said second electrode;
   (C) placing said first and second composites together such that said first and second electrodes face each other with said first and second dielectric layers touching each other and being located between said first and second electrodes; and thereafter
   (D) firing said first and second composites to simultaneously sinter said first and second dielectric layers whereby said first and second dielectric layers are integrated with each other.

* * * * *